United States Patent
Lundquist et al.

(10) Patent No.: US 9,560,537 B1
(45) Date of Patent: Jan. 31, 2017

(54) SYSTEMS AND METHODS FOR DETERMINING A LOCATION OF A SIGNAL EMITTER BASED ON SIGNAL POWER

(71) Applicant: ANRITSU COMPANY, Morgan Hill, CA (US)

(72) Inventors: Randy Lundquist, Shelley, ID (US); Mark Heimbach, Morgan Hill, CA (US); Eric Hakanson, Morgan Hill, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days.

(21) Appl. No.: 14/885,911

(22) Filed: Oct. 16, 2015

Related U.S. Application Data

(60) Provisional application No. 62/065,536, filed on Oct. 17, 2014.

(51) Int. Cl.
*H04W 24/00* (2009.01)
*H04W 24/08* (2009.01)
*H04L 27/26* (2006.01)

(52) U.S. Cl.
CPC .......... *H04W 24/08* (2013.01); *H04L 27/2614* (2013.01)

(58) Field of Classification Search
None
See application file for complete search history.

(56) References Cited

U.S. PATENT DOCUMENTS

| | | | |
|---|---|---|---|
| 2005/0020284 A1* | 1/2005 | Benco | H04W 16/18 455/456.6 |
| 2013/0279488 A1* | 10/2013 | Singh | H04W 48/16 370/338 |
| 2014/0195176 A1* | 7/2014 | Jones | H04B 17/00 702/58 |

OTHER PUBLICATIONS

Rohde & Schwarz, "R&S® ADDx Single-Channel DF Antennas Product Overview", Rohde & Schwarz, Apr. 2014 (26 pages).
Rohde & Schwarz, "R&S® DDF007 Portable Direction Finder Full Range of Functions in a Handheld Format", Rohde & Schwarz, Oct. 2013 (12 pages).

* cited by examiner

*Primary Examiner* — Alejandro Rivero
(74) *Attorney, Agent, or Firm* — Tucker Ellis LLP

(57) ABSTRACT

A method of estimating a location of an interference signal source includes using a first antenna configured to receive a signal from the interference signal source and using a second antenna arranged proximate to the first antenna and configured to receive global positioning system (GPS) signals. An initial trend in variation in power of a received signal from the interference signal source is determined relative to a position of the second antenna, wherein upon determining the initial trend, the initial trend is a current trend. In an iterative manner, the second antenna is directed to be repositioned and a current trend in the peak measurement in power is observed until an estimate of the location of the interference signal source is determined.

20 Claims, 14 Drawing Sheets

SYSTEMS AND METHODS FOR DETERMINING A LOCATION OF A SIGNAL EMITTER BASED ON SIGNAL POWER

CLAIM OF PRIORITY

This application claims the benefit of priority to U.S. Provisional Application titled "SYSTEMS AND METHODS FOR DETERMINING A LOCATION OF A SIGNAL EMITTER BASED ON SIGNAL POWER", Application No. 62/065,536, filed Oct. 17, 2014.

TECHNICAL FIELD

The present invention relates to detecting and locating sources of signal interference.

BACKGROUND

Interference in telecommunication networks is becoming more and more problematic as demand for wireless services continues to grow and allocated frequency bands become compressed. Interference can result in noisy links in analog transmissions, and limited range, dropped calls, or low data rates for digital transmissions. An indicator of interference in digital signals is a high noise floor in a receive channel. Upon identifying and locating a high receive noise floor, a spectrum analyzer can be employed to look for interference on the receive frequencies. Once an interfering signal is detected, the signal can be characterized to possibly identify the source of the interfering signal.

Sources of interference can be internal to a telecommunication network or can be external to the telecommunication network. External sources of interference can include not only signal transmitters, but also sources of impulse noise created whenever a flow of electricity is abruptly started or stopped. Many external, interfering signals cannot be identified using typical techniques and the source of the signal must be located by hunting for the source. However, the variety of different possible sources of interference and the ability of some sources to interfere from great distances, can make locating the source difficult.

SUMMARY

In accordance with an embodiment, a system and method of estimating a location of an interference signal source includes using a first antenna configured to receive a signal from the interference signal source and using a second antenna arranged proximate to the first antenna and configured to receive global positioning system (GPS) signals. An initial trend in variation in power of a received signal from the interference signal source is determined relative to a position of the second antenna, wherein upon determining the initial trend, the initial trend is a current trend. In an iterative manner, the second antenna is directed to be repositioned and a current trend in the peak measurement in power is observed until an estimate of the location of the interference signal source is determined.

DETAILED DESCRIPTION

Figure 1:
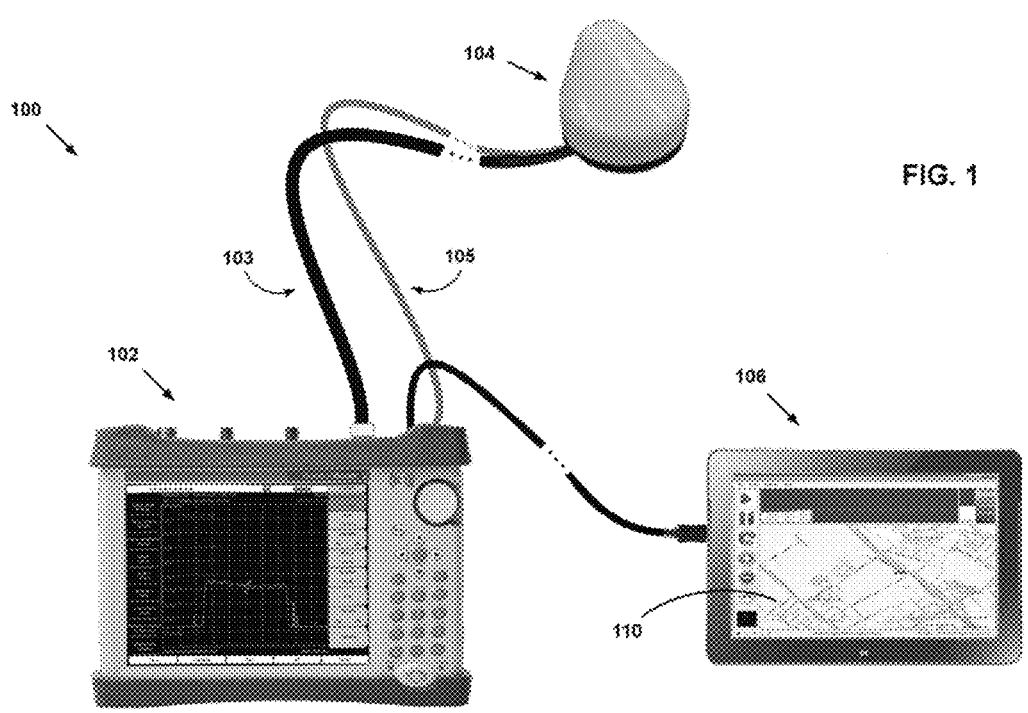
FIG. 1 illustrates a system for determining a location of a signal emitter in accordance with the present invention.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

It would be apparent to one of skill in the art that the present invention, as described below, may be implemented in many different embodiments of hardware, software, firmware, and/or the entities illustrated in the figures. Any actual software, firmware and/or hardware described herein is not limiting of the present invention. Thus, the operation and behavior of the present invention will be described with the understanding that modifications and variations of the embodiments are possible, given the level of detail presented herein.

External sources of interference capable of unacceptably affecting a telecommunication network can be difficult to locate, due to the myriad different types of sources capable of emitting interference and the fact that interference can be created at great distances. In order to more quickly locate a source, it is preferable to approximate a likely location of the source to narrow the geographic range of the location, and to follow this approximation with a search on foot to finally identify the location and nature of the source.

Currently, available techniques for approximating a likely location of a source of interference rely on the use of a direction finding (DF) antenna consisting of an array of antenna elements. One technique uses measurement of the phase angles between a reference antenna element and the other elements of the DF antenna to determine a direction from which an interfering signal is received. A correlative interferometer, for example, compares the measured phase differences with the phase differences obtained for a DF antenna system of known configuration at a known wave angle (i.e., a reference data set). The comparison is made for different azimuth values of the reference data set and the bearing is obtained from the data for which the correlation coefficient is at a maximum. Some techniques further locate the source of the interfering signal by means of a running fix, taking bearings at multiple locations and calculating the location of the source from the results using triangulation.

A DF antenna used for approximating a likely location of a source of interference can be quite large. For example, a nine element DF antenna usable to detect an LTE signal with a downlink band centered at about 880 MHz can be larger than three feet in diameter. Further, DF antennas typically operate in limited frequency bands, and due to their limited applicability, can be orders of magnitude more costly relative to omnidirectional antennas, which are widely used for a variety of applications, generally inexpensive, and usable over a wide range of frequencies.

FIG. 1 illustrates a system for locating a source of interference signal in accordance with an embodiment. The system is usable by a user, such as a field engineer and/or technician, to approximate the location of the interference signal source, reducing the amount of time required to eliminate or mitigate the interference signal source. Wireless carriers, regulatory agencies and broadcast and satellite operators, among others, can benefit from the ability to quickly narrow a location of the interference signal source to improve performance and/or reduce customer downtime. The system comprises an omnidirectional antenna and a global positioning system (GPS) antenna arranged proximate to the omnidirectional antenna. As shown, both antennas are housed as a single unit 104, although in other embodiments, the antennas can be separately housed. Further, as shown the single unit 104 includes a magnetized base, allow the single unit 104 to be mounted and held fixed on a metal roof of a vehicle, for example. By mounting to a vehicle, the system can quickly measure target signals received by the omnidirectional antenna over a large geographical area.

The system further comprises a spectrum analyzer 102. The omnidirectional antenna can be connected with the spectrum analyzer at a radio frequency (RF) IN port of the spectrum analyzer via a first cable 103, while the GPS antenna can be connected with the spectrum analyzer at a GPS port of the spectrum analyzer via a second cable 105. In an embodiment, the omnidirectional antenna is usable across a wide frequency range of the spectrum analyzer. In an embodiment, the omnidirectional antenna is usable over substantially the entire frequency range of the spectrum analyzer, thereby permitting use of a single omnidirectional antenna for any frequency allocated in the range of the spectrum analyzer (e.g., 9 kHz to 43 GHz for the MS2720T SPECTRUM MASTER® available from ANRITSU™).

The spectrum analyzer can further connected with a computing device 106 on which a software system for locating the interference signal source is installed. As used herein, a software system includes a logic which is configured to perform methods in accordance with embodiments and can include instructions which when executed by a computer system, perform the particular method. In an embodiment, the system and method performed using the system are adapted to operate/process according to a particular algorithm, as generally described below, for example. As shown, the computing device is a tablet computer connected with the spectrum analyzer via a USB cable; however, in other embodiments the computing device can be any other device capable of executing the software system and communicating instructions to a use. For example, the computing device can be a laptop computer, mobile phone, or a computer integrated into a vehicle. Further, in other embodiments the GPS signal can be obtained from some other source, for example a commercially available navigation system, which when received by the computing device or the spectrum analyzer, can be synchronized and combined with RF power measurements to determine a location of the measurements.

In an embodiment, the system need not transmit signals, but rather receives signals, measuring power in those signals falling within a target frequency or band of frequencies. The software system can use channel power measurements to enable locating a variety of signal types, from wideband modulated signals to narrowband or continuous wave (CW) signals. In an embodiment, the channel power bandwidth of the software system is configurable as appropriate for the target interference signal source. The software system can also be configured to track signals having a frequency that drifts over time.

As will be appreciated, an interference signal source will commonly emit at a frequency or in a frequency band that is actively being used by a telecommunication network to transmit signals. For example, an interference signal source may be emitting a signal hidden in an LTE uplink band that is actively being used by the telecommunication network. In an embodiment, the location software can use a "min hold" algorithm to capture the interfering signal while eliminating the LTE traffic signal from measurement consideration. For example, a transmission can include a 20 MHz band that will periodically be dead. The min hold algorithm is an algorithm that identifies the interference signal source at the minimum received power. The received signal from the telecommunications network will drop to baseline over the course of a few seconds, allowing the interference signal to be identified. Further, in an embodiment, the location software is usable to locate pulsed signals via a "max hold" algorithm that captures intermittent signals only when transmitting, thereby avoiding erroneously measuring a pulsed signal when the pulsed signal is not active.

Figure 2:
FIGS. 2 and 3 illustrate an exemplary screenshot of an application usable with systems and methods in accordance with embodiments of the present invention, the screenshot showing initial data collection.
Figure 3:
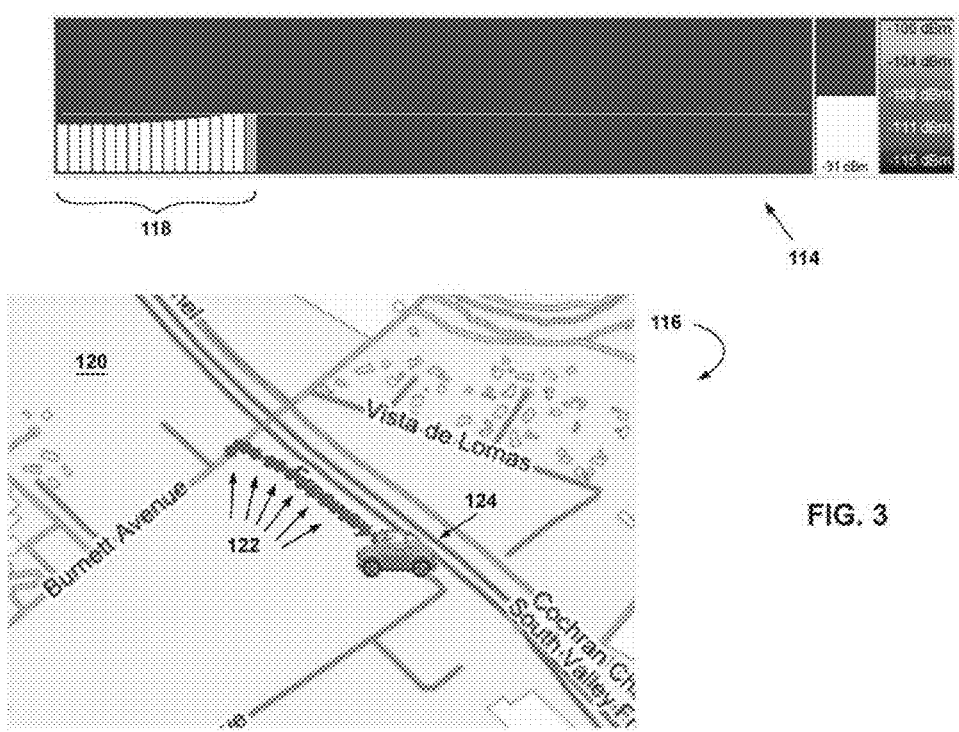

FIG. 2 illustrates an exemplary screenshot and FIG. 3 illustrates a partial screenshot of an application executed by the software system and usable with systems and methods in accordance with an embodiments. The screenshot shows initial data collection by a user having installed and activated the system on a vehicle. In the embodiment, the single unit comprising the omnidirectional and GPS antennas is positioned and magnetically held on the roof of the vehicle, with the first and second cables entering the cabin of the vehicle which can hold the spectrum analyzer and the computing device. Initial data collection includes measurements obtained using the spectrum analyzer and provided to the computing device. As shown, power levels of individual measurements are displayed as a bar chart of power levels in a power display 114 at the top of the application. Individual measurements can be removed from the power display if the data is collected and a measurement is determined to be the result of a reflection or other anomalous source. As the vehicle approaches the source of the interfering signal, the power level of a measurement increases. As the vehicle drives further away from the source of the interfering signal, the power level of a measurement decreases. A running statistical calculation is performed from obtained data to estimate the location of the source base on the measurement data and associated GPS data.

In an embodiment, the software system divides the search area into a grid, assigning measurements to cells of the grid as appropriate. For example, in an embodiment the software system can take a space that is a square two miles on a side, where the current location is the center of the square, and divide the space into one hundred rows and one hundred columns to create ten thousand cells. In an embodiment, an algorithm of the system software assumes that the source of the interfering signal is modeled at a time in each of those cells, so that ten thousand calculations are performed at a time. The software system then determines a best match between the data and the models. The software system attempts to identify the grid cell, which if it had a source, would give you the power distribution measured as the vehicle drives around. The models and best match are performed without actual knowledge of the power of the source of the interfering signal, and the ten thousand calculations are performed multiple times in an iterative fashion to determine the power as well as the position that provides the best match.

Below the power display is a map display 116 illustrating the position of the vehicle 124 and the position of measurements 122 on a map 120 of at least a portion of the geographic search area. As shown, the system has made seventeen power measurements at seventeen locations. GPS data obtained in synchronization with each power measurement is used to assign the measurements to location on the map and the measurements are illustrated on the map to resemble a "bread crumb" trail. The screenshot also illustrates a control display 112 provided to a user to control the collection and display of measurement data.

Figure 4:
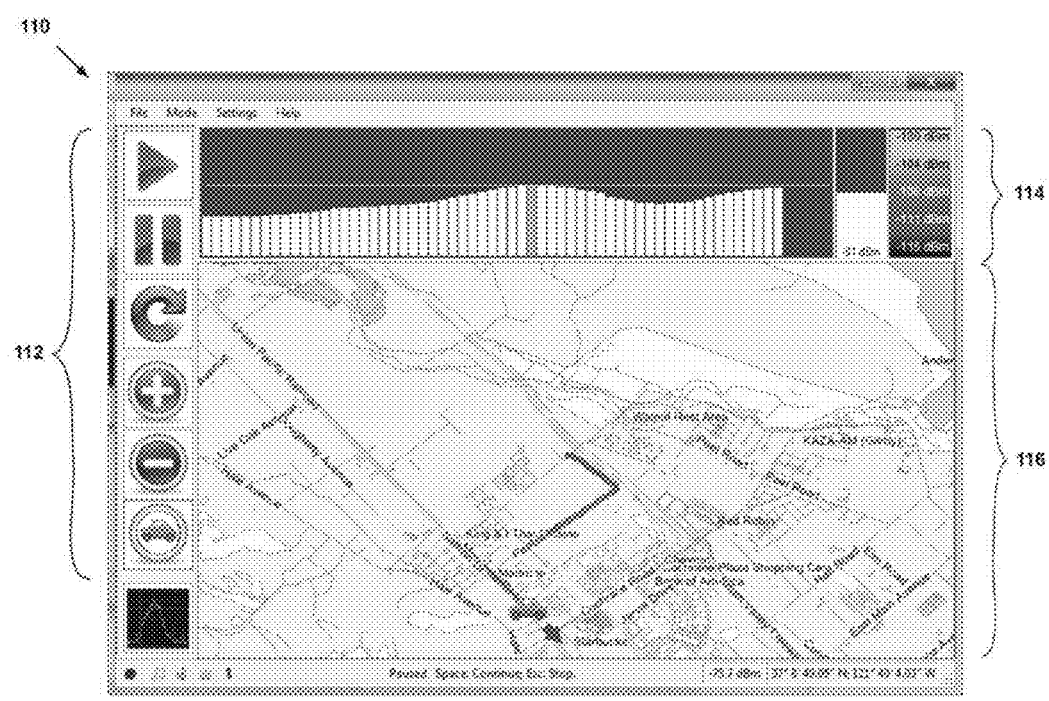
FIGS. 4-9 illustrate exemplary screenshots of the application showing additional data collection and a first stage of locating a source of interference.
Figure 5:
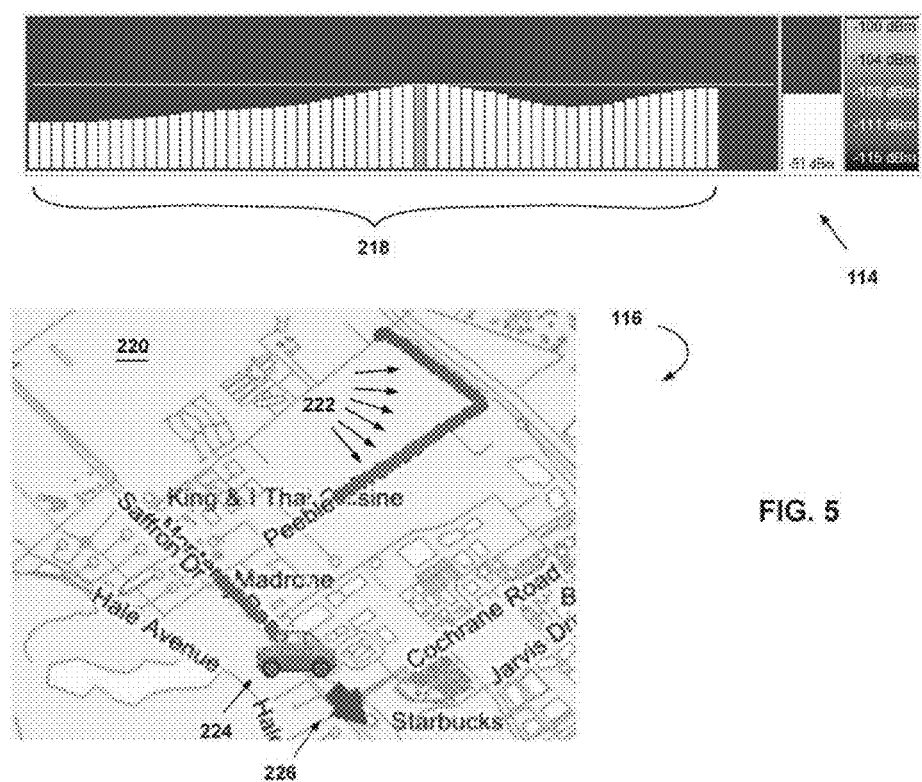

FIG. 4 illustrates an exemplary screenshot and FIG. 5 illustrates a partial screenshot of the application executed by the software system showing the system entering a stage of directing a user to collect additional data in specified locations. In an embodiment, this stage is entered by the software system when the software system has identified a peak in data (the shaded bar in the middle of the power display) that exceeds a minimum threshold, with a minimum number of usable measurements (e.g., thirty five) having been obtained. As shown, fifty-nine measurements 218, 222 are obtained and illustrated on the map 220, with the peak having been obtained midway in the data set. The software system then begins to provide directions for driving the vehicle 224 to obtain additional data. In an embodiment, the directions are formulated with knowledge of the street layout of the map, to thereby predict a potential positions for additional data likely to further benefit a determination of approximate location of the source. As shown, an arrow indicator 226 appears on the map display indicating a direction of travel. The arrow indicator can be estimated, for example, based on a determination made by the software system of a direction in which power is likely to increase. In an embodiment, the software system can further provide an audial cue to the user, for example in the form of a voice, as used in turn-by-turn direction devices. In other embodiments, alternative or additional audial and visual cues can be used to instruct the user as to where to position the vehicle.

Figure 6:
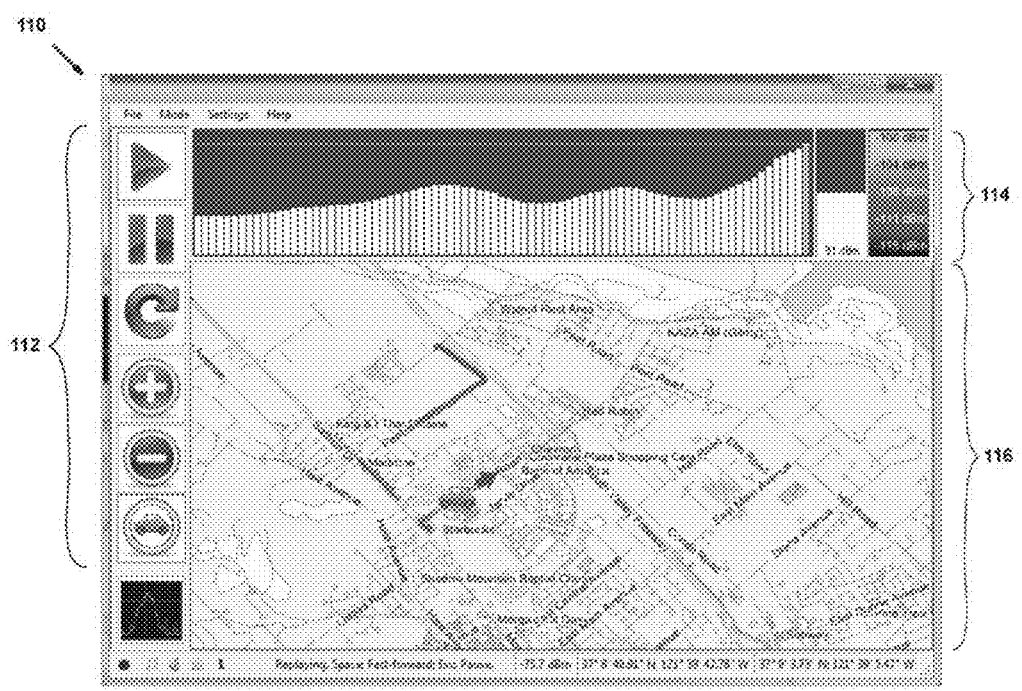
Figure 7:
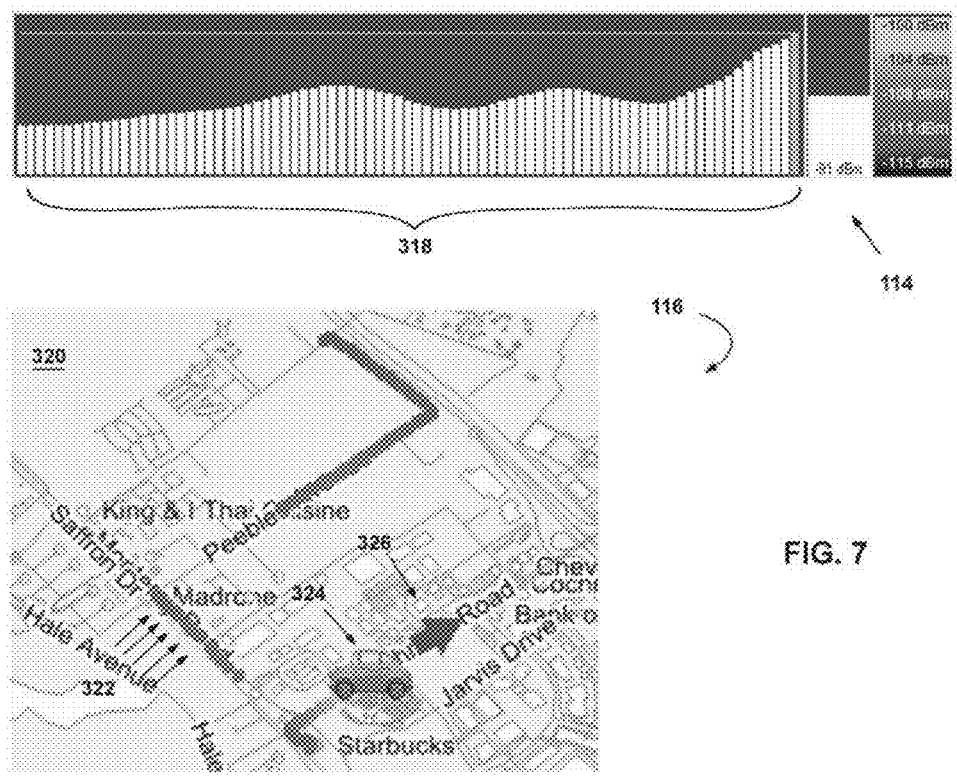

FIG. 6 illustrates an exemplary screenshot and FIG. 7 illustrates a partial screenshot of the application executed by the software system showing the system continuing the stage of directing the user to collect additional data in specified locations. As shown, the system has obtained a large set of measurement data 318, 322 shown in sequence of collection in the power display and illustrated on the map 320. A new maximum measurement is identified from the data; however, the power level has not decreased to indicate that the vehicle has passed the source and the vehicle 324 continues to be provided a cue on the map 320 of an arrow indicator 326 indicating a direction of travel.

Figure 8:
Figure 9:
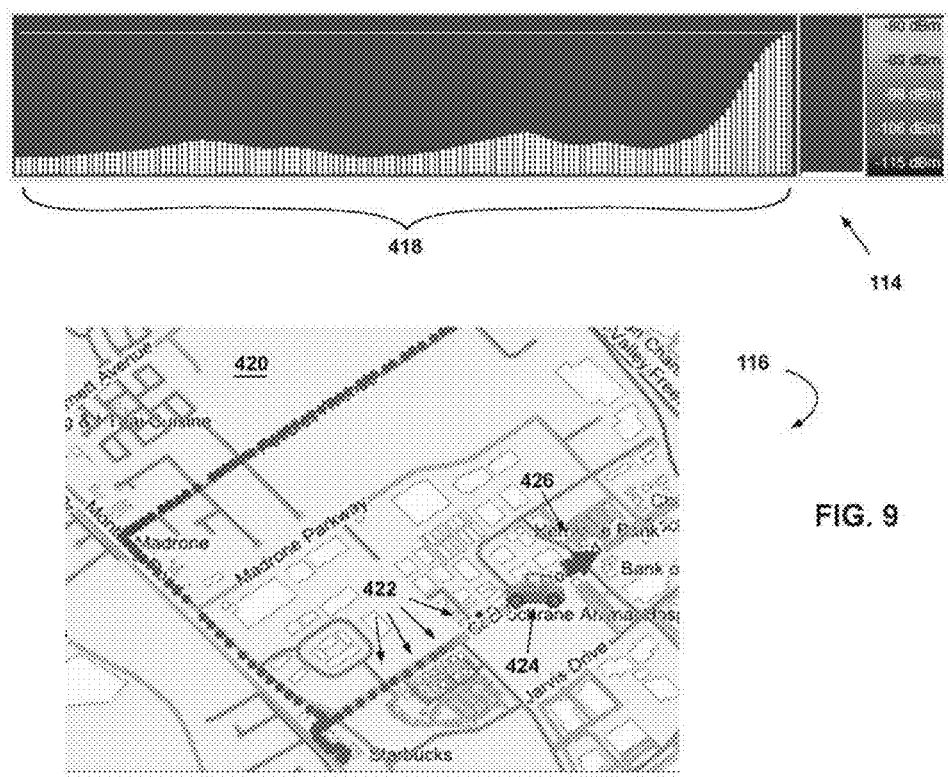

FIG. 8 illustrates an exemplary screenshot and FIG. 9 illustrates a partial screenshot of the application executed by the software system showing the system continuing the stage of directing the user to collect additional data in specified locations. As shown, the large set of measurement data 418, 422 continues to grow and continues to be shown in sequence of collection in the power display and illustrated on the map 420. The new maximum measurement continues to increase and be identified from the data, and the vehicle 424 continues to be provided a cue on the map 420 of an arrow indicator 426 indicating a direction of travel.

Figure 10:
FIGS. 10-13 illustrate exemplary screenshots of the application showing additional data collection and a second stage of locating a source of interference.
Figure 11:
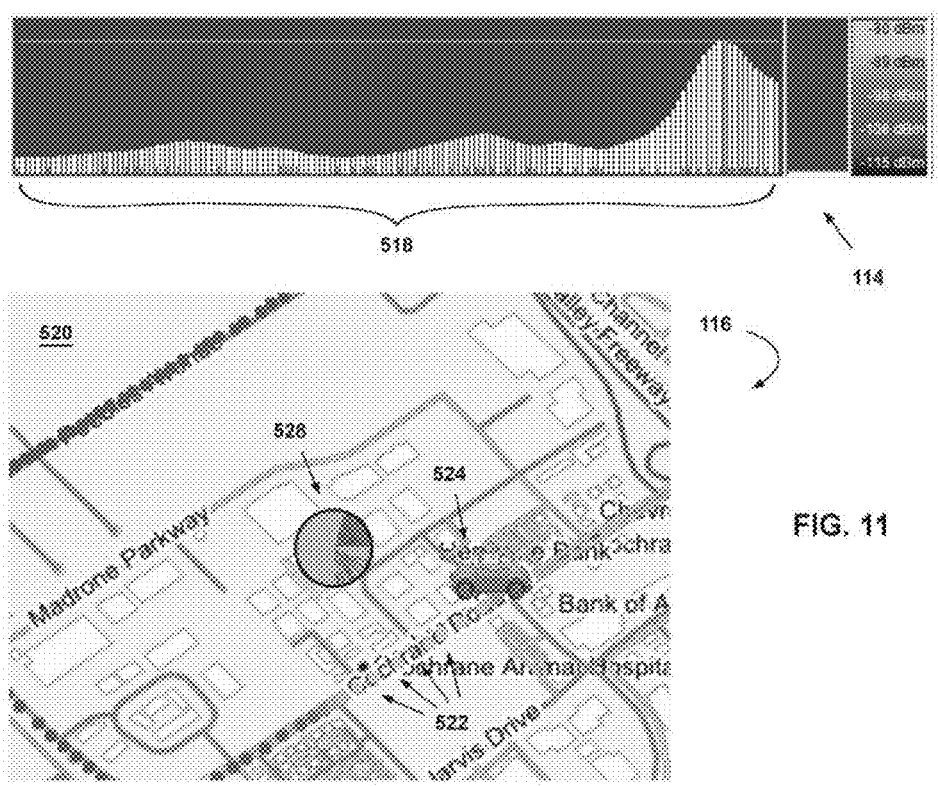

FIG. 10 illustrates an exemplary screenshot and FIG. 11 illustrates a partial screenshot of the application executed by the software system showing the system entering a stage of estimating and illustrating an approximate location of the source of interference, along with a degree in confidence determined in the estimate based on the aggregate of the measurements of power and location. In an embodiment, this stage is entered by the software system when the software system has identified a peak in data (the shaded bar of the power display) that exceeds a minimum threshold, with a minimum number of usable measurements having been obtained. In an embodiment, initial data can be discounted relative to newer data as contributing less, based on distance from estimated location. This can be indicated on the map 520 by the darkness in shading of the "bread crumbs" representing measurements 522. As shown, the lighter shaded measurements indicate measurements that are more heavily weighted in an estimation.

In an embodiment, the estimate of the location of the interference signal source is represented visually on the map in the form of a circle 528 shaded to indicate the data that forms the basis of the estimate. As shown, the lightly shaded areas of the circle indicate a direction from which data has been obtained and the darker shaded areas of the circle indicate a direction from which no data has been obtained or a direction from which a degree of confidence in the data is low. As shown, the alternatingly shaded sections of the circle indicate that the vehicle was driving at such a speed that measurements were spaced out far enough to include gaps between the measurements. As noted above, the software system can divide the search area into a grid, assigning measurements to the grid as appropriate and displaying the circle so that the circle is sized to cover all of the areas of the grid that exceed a certain confidence threshold. In an embodiment, the software system can calculate a value indicating a likelihood that a source is in each cell. The system software then finds the maximum cell value and assigns all values within a percentage (i.e., the confidence threshold) of that value to the circle. Thus, the circle could be as large as several cells of the grid, or as small as a single cell of the grid. There is a probability of location for each grid cell. In an embodiment, the user is then instructed to drive to, near or around the estimated location to confirm the estimate generated by the data set. As will be appreciated, obtaining data in the direction defined by rays extending out from portions of the circle that are darkly shaded (and that thereby indicate a paucity of data).

Figure 12:
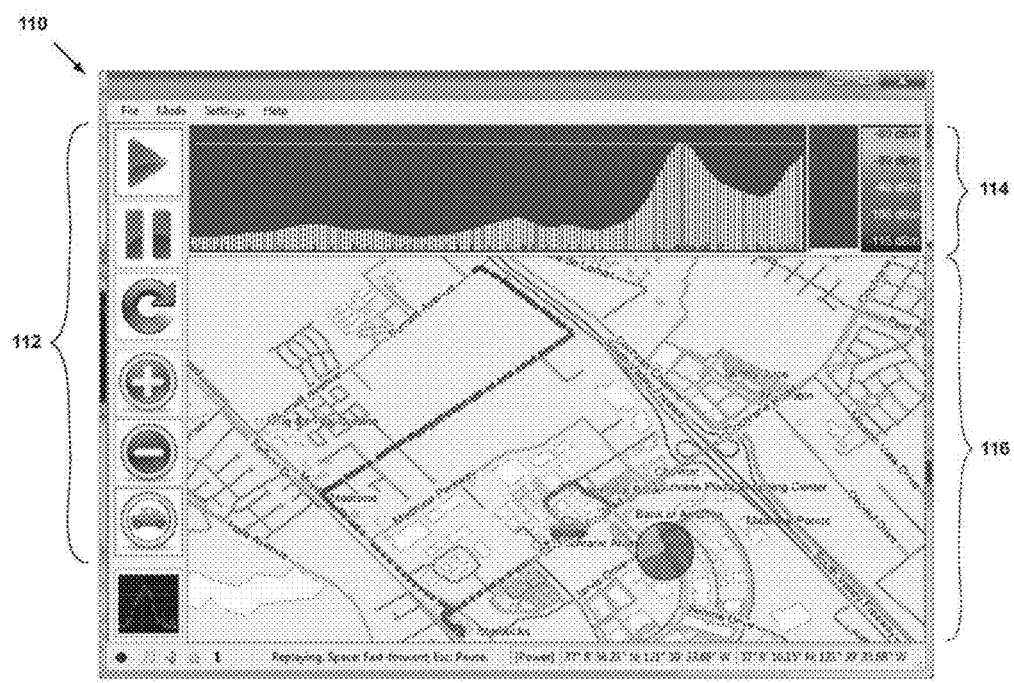
Figure 13:
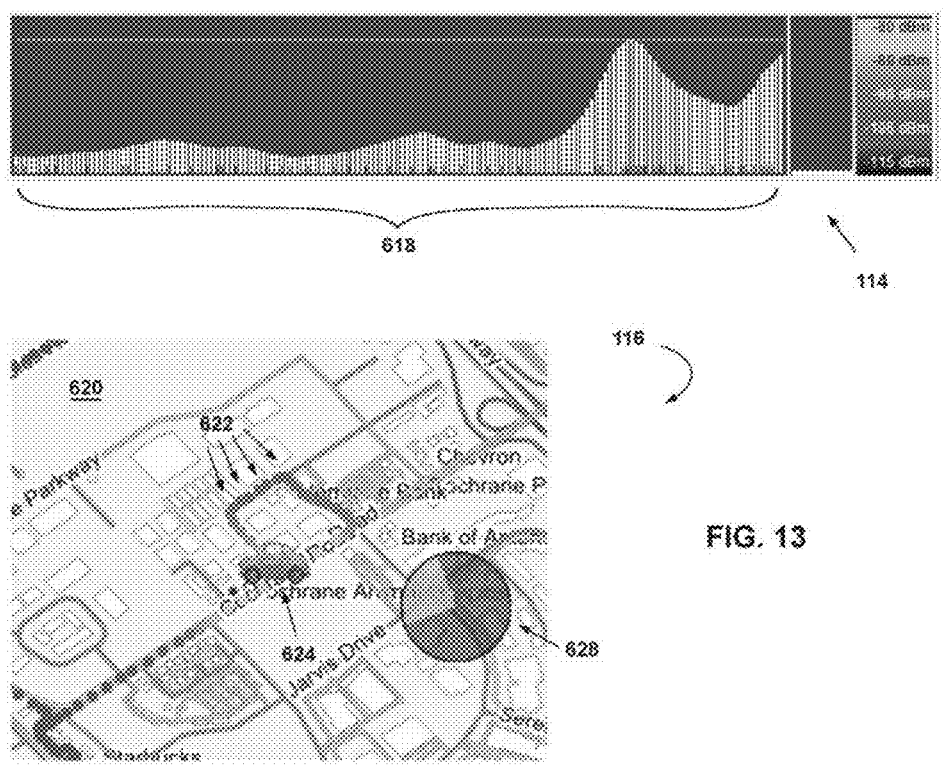

FIG. 12 illustrates an exemplary screenshot and FIG. 13 illustrates a partial screenshot of the application executed by the software system showing the system continuing in the stage of estimating and illustrating an approximate location of the source of interference, along with a degree in confidence determined in the estimate based on the aggregate of the measurements of power and location. However, as shown, the vehicle 624 and additional measurements 622 as displayed on the map 620 illustrate that the initial estimate is incorrect, and a new estimate is generated from the data set with the additional measurements (or refined to eliminate sources of false positives). The new estimate is displayed again as a new circle 628. As can be seen, the new circle is larger than the previous, indicated that the source of the interference is estimated to be within one of several cells on the grid. Further, the darkly shaded portion of the new circle indicates locations where additional data can be obtained to refine the estimate.

It is noted that calculation time can increase exponentially with more data points. In an embodiment, the software system caps a number of measurements used to calculate an estimate for location (e.g., 50 data points). As can be seen in FIGS. 10-13, ticks can be seen in multiple power measurements in the bar charts of the power display. The bars with ticks indicate power measurements used to calculate an estimate for location. Although the low power regions are useful for indicating where the source is not, high power readings can be more useful information for determining the location of the source. In a typical search, low power readings are more common, with high power reading indicating that the user is closing in on a signal source. In an embodiment, the software system can apply a statistical distribution function to randomly select which power measurements to use, heighted heavily towards high power readings, thus bars with ticks are denser where the power is highest.

As will be appreciated, the source location relocates from one side of the map display of "Cochrane Road" to the other side. If the vehicle is driving down a road in a straight line, an interferer can be on either side of the vehicle and respond similarly in terms of power levels. For example, power can increase as the vehicle travels down the road, and power can increase in the same fashion from an interferer on either side of the road. Distance from the interferer can be estimated based on a rate of power decrease, as power will decrease predictably (e.g., using an inverse square law), but the distance estimating can be correct to an interferer on either side of the road, as the measurement is symmetrical along the road. For this reason, a sufficient amount of data obtained from multiple directions is preferred to provide estimates of a source of an interfering signal (e.g., measurement from multiple axes).

Figure 14:
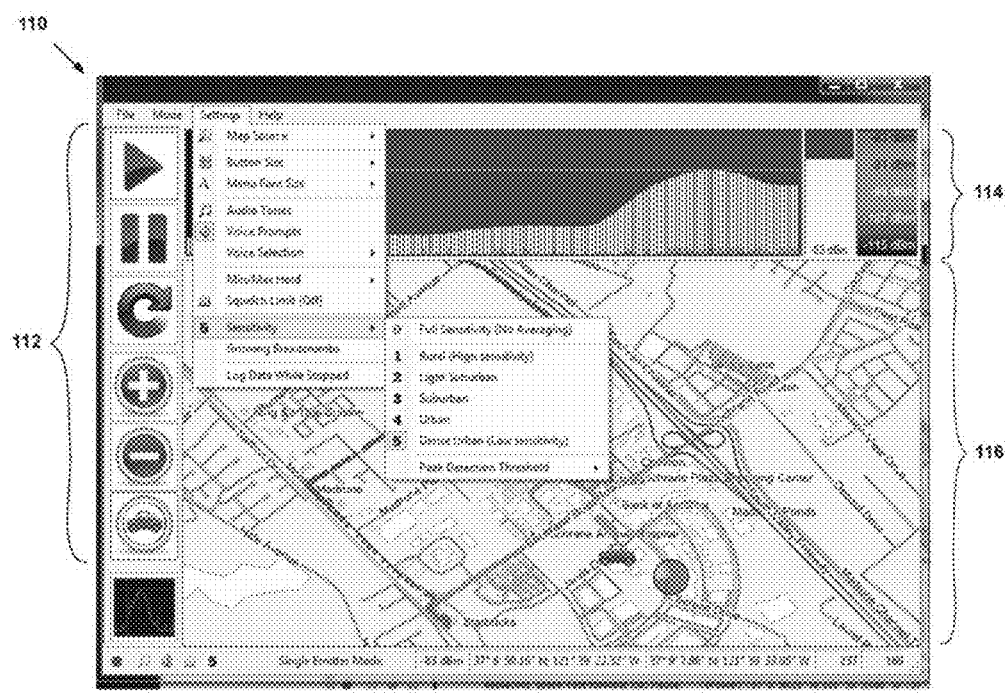
FIG. 14 illustrates an exemplary screenshot of the application showing an adjustment in sensitivity of the application.

As shown in FIG. 14, at any point the user can access the setting of the software system and modify the sensitivity of the measurement data collection algorithm. As shown, the user can cycle through different sensitivities at will to recondition all of the data obtained during the process and/or to modify how data is collected. For example, if the user is within an urban canyon where there is lots of signal reflection of tall buildings, the sensitivity can be set to dense urban, to thereby increase data smoothing to remove artifacts that arise in dense areas, such as signal reflections, multi-path problems and attenuation. For example, heavier statistical analysis can be employed to predict a likelihood of data being usable and useful. It has been observed by the inventors that multipath reflections of GPS signals in dense urban areas can be problematic, and the vehicle's apparent location can shift, even while stopped. In an embodiment measurement data is not collected when a vehicle is stopped, so that decreasing sensitivity in urban areas can include increasing a distance required for the vehicle to be considered as moving.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method of estimating a location of an interference signal source, the method comprising:
    using a first antenna configured to receive an interference signal from the interference signal source;
    using a second antenna arranged proximate to the first antenna and configured to receive global positioning system (GPS) signals;
    determining an initial trend in variation in power of the interference signal from the interference signal source relative to a position of the second antenna by iteratively performing steps including
        measuring the power of the interference signal received using the first antenna,
        receiving three or more GPS signals using the second antenna,
        determining the position of the second antenna based on the received GPS signals when measuring the power of the interference signal, and
        comparing the power of the interference signal and the position of the second antenna to previously measured powers of the interference signal and determined positions of the second antenna;
    setting, upon determining the initial trend, a current trend to be the initial trend;
    directing a repositioning of the second antenna by iteratively performing steps including
        indicating a direction for the repositioning of the second antenna based on the current trend,
        measuring the power of the interference signal received using the first antenna,
        receiving three or more GPS signals using the second antenna,
        determining the position of the second antenna based on the received GPS signals when measuring the power of the interference signal, and
        refining the current trend based on the power of the interference signal and the position of the second antenna; and
    determining an estimate of the location of the interference signal source upon obtaining a minimum number of usable measurements and observing in the current trend a peak measurement of power exceeding a minimum threshold;
    determining a confidence in the estimate; and
    indicating the location of the interference signal source, upon determining the estimate, on a map presented on a display;
    wherein the indication of the location includes an indication of the confidence in the estimate.

2. The method of claim 1, wherein the indication of confidence in the estimate includes an indication of a direction relative to the location where the power of the interference signal has been measured.

3. The method of claim 2, wherein the indication is an icon located on the map and the indication of confidence includes shading of the icon.

4. The method of claim 3, wherein the map is divided into a plurality of cells and the icon is sized to overlap one or more of the cells based on the estimate.

5. The method of claim 1, wherein the estimate is a current estimate and the method further comprising:
    iteratively performing steps including
        measuring the power of the interference signal received using the first antenna,
        receiving three or more GPS signals using the second antenna,
        determining the position of the second antenna based on the received GPS signals when measuring the power of the interference signal, and
        refining the current estimate of the location of the interference signal source based on the power of the interference signal and the position of the second antenna, an
        indicating the location of the interference signal source on the map based on the refined current estimate.

6. The method of claim 1, wherein the map is divided into a plurality of cells; and
    wherein the estimate of the location of the interference signal source is determined by
        generating a data plot by assigning each measurement of power to a cell of the map based on a corresponding determination of location of the second antenna,
        generating a plurality of models,
        wherein each model assigns the interference signal source to a cell from the plurality of cells,
        wherein each model assigns a transmit power of the interference signal source, and
        determining one or more best models from the plurality of models that matches the data plot within a predetermined margin based on a best fit analysis, and
        estimating the location of the interference signal source as one or more cells based on the determination of the one or more best models.

7. The method of claim 6, wherein the data plot is generated using measurements of power and corresponding determination of location of the second antenna up to a predefined maximum number selected from the collected measurements of power.

8. The method of claim 7, wherein the selected measurements are selected based on power level and statistical estimate of reliability.

9. A system for estimating a location of an interference signal source, the system comprising:
    an omnidirectional antenna configured to receive an interference signal from the interference signal source;
    a global positioning system (GPS) antenna arranged proximate to the first antenna and configured to receive global positioning system (GPS) signals;
    a spectrum analyzer configured to receive data from the GPS antenna and the omnidirectional antenna;
    one or more microprocessors;
    a non-transitory computer readable storage medium having instructions stored thereon which when executed cause the one or more microprocessors to estimate the location of the interference signal source, the instructions including
        determining an initial trend in variation in power of the interference signal from the interference signal source relative to a position of the GPS antenna by iteratively performing steps including
            measuring the power of the interference signal received using the omnidirectional antenna,
            receiving three or more GPS signals using the GPS antenna,
            determining the position of the GPS antenna based on the received GPS signals when measuring the power of the interference signal, and
            comparing the power of the interference signal and the position of the GPS antenna to previously measured powers of the interference signal and determined positions of the GPS antenna;
        setting, upon determining the initial trend, a current trend to be the initial trend;
        directing a repositioning of the GPS antenna by iteratively performing steps including
            indicating a direction for the repositioning of the GPS antenna based on the current trend,
            measuring the power of the interference signal received using the omnidirectional antenna,
            receiving three or more GPS signals using the GPS antenna,
            determining the position of the GPS antenna based on the received GPS signals when measuring the power of the interference signal, and
            refining the current trend based on the power of the interference signal and the position of the GPS antenna; and
        determining an estimate of the location of the interference signal source upon obtaining a minimum number of usable measurements and observing in the current trend a peak measurement of power exceeding a minimum threshold;
        determining a confidence in the estimate; and
        indicating the location of the interference signal source, upon determining the estimate, on a map presented on a display;
    wherein the indication of the location includes an indication of the confidence in the estimate.

10. The system of claim 9, wherein the indication of confidence in the estimate includes an indication of a direction relative to the location where the power of the interference signal has been measured.

11. The system of claim 9, wherein the estimate is a current estimate and the instructions further comprising:
    iteratively performing steps including
        measuring the power of the interference signal received using the omnidirectional antenna,
        receiving three or more GPS signals using the GPS antenna,
        determining the position of the GPS antenna based on the received GPS signals when measuring the power of the interference signal, and
        refining the current estimate of the location of the interference signal source based on the power of the interference signal and the position of the GPS antenna, and
        indicating the location of the interference signal source on the map based on the refined current estimate.

12. The system of claim 9, wherein the map is divided into a plurality of cells; and
    wherein the estimate of the location of the interference signal source is determined by generating a data plot by assigning each measurement of power to a cell of the map based on a corresponding determination of location of the GPS antenna, generating a plurality of models, wherein each model assigns the interference signal source to a cell from the plurality of cells, wherein each model assigns a transmit power of the interference signal source, and determining one or more best models from the plurality of models that matches the data plot within a predetermined margin based on a best fit analysis, and estimating the location of the interference signal source as one or more cells based on the determination of the one or more best models.

13. The system of claim 12, wherein the data plot is generated using measurements of power and corresponding determination of location of the GPS antenna up to a predefined maximum number selected from the collected measurements of power.

14. The system of claim 13, wherein the selected measurements are selected based on power level and statistical estimate of reliability.

15. A non-transitory computer readable storage medium having instructions thereon which when executed cause one or more microprocessors to estimate a location of an interference signal source, the instructions including:

determining an initial trend in variation in power of an interference signal from the interference signal source relative to a position of a global positioning system (GPS) antenna by iteratively performing steps including measuring the power of the interference signal received using an omnidirectional antenna, receiving three or more GPS signals using the GPS antenna, determining the position of the GPS antenna based on the received GPS signals when measuring the power of the interference signal, and comparing the power of the interference signal and the position of the GPS antenna to previously measured powers of the interference signal and determined positions of the GPS antenna;

setting, upon determining the initial trend, a current trend to be the initial trend;

directing a repositioning of the GPS antenna by iteratively performing steps including indicating a direction for the repositioning of the GPS antenna based on the current trend, measuring the power of the interference signal received using the omnidirectional antenna, receiving three or more GPS signals using the GPS antenna, determining the position of the GPS antenna based on the received GPS signals when measuring the power of the interference signal, and refining the current trend based on the power of the interference signal and the position of the GPS antenna; and determining an estimate of the location of the interference signal source upon obtaining a minimum number of usable measurements and observing in the current trend a peak measurement of power exceeding a minimum threshold;

determining a confidence in the estimate; and indicating the location of the interference signal source, upon determining the estimate, on a map presented on a display;

wherein the indication of the location includes an indication of the confidence in the estimate.

16. The non-transitory computer readable storage medium of claim 15, wherein the indication of confidence in the estimate includes an indication of a direction relative to the location where the power of the interference signal has been measured.

17. The non-transitory computer readable storage medium of claim 15, wherein the instructions include the further steps of:

iteratively performing steps including measuring the power of the interference signal received using the omnidirectional antenna, receiving three or more GPS signals using the GPS antenna, determining the position of the GPS antenna based on the received GPS signals when measuring the power of the interference signal, and refining the current estimate of the location of the interference signal source based on the power of the interference signal and the position of the GPS antenna, and indicating the location of the interference signal source on the map based on the refined current estimate.

18. The non-transitory computer readable storage medium of claim 15, wherein the map is divided into a plurality of cells; and wherein the estimate of the location of the interference signal source is determined by generating a data plot by assigning each measurement of power to a cell of the map based on a corresponding determination of location of the GPS antenna, generating a plurality of models, wherein each model assigns the interference signal source to a cell from the plurality of cells, wherein each model assigns a transmit power of the interference signal source, and determining one or more best models from the plurality of models that matches the data plot within a predetermined margin based on a best fit analysis, and estimating the location of the interference signal source as one or more cells based on the determination of the one or more best models.

19. The non-transitory computer readable storage medium of claim 18, wherein the data plot is generated using measurements of power and corresponding determination of location of the GPS antenna up to a predefined maximum number selected from the collected measurements of power.

20. The non-transitory computer readable storage medium of claim 18, wherein the selected measurements are selected based on power level and statistical estimate of reliability.

* * * * *